US010848726B2

(12) United States Patent
Liu et al.

(10) Patent No.: US 10,848,726 B2
(45) Date of Patent: Nov. 24, 2020

(54) COLOR-SHIFT CALIBRATION METHOD AND DEVICE

(71) Applicant: Realtek Semiconductor Corporation, Hsinchu (TW)

(72) Inventors: Kai Liu, Taipei (TW); Wen-Tsung Huang, Chiayi (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 114 days.

(21) Appl. No.: 16/183,923

(22) Filed: Nov. 8, 2018

(65) Prior Publication Data

US 2019/0141305 A1 May 9, 2019

(30) Foreign Application Priority Data

Nov. 8, 2017 (TW) ............................ 106138673 A

(51) Int. Cl.

| | |
|---|---|
| ***G06K 9/00*** | (2006.01) |
| ***H04N 9/64*** | (2006.01) |
| ***H04N 17/02*** | (2006.01) |
| ***H04N 9/04*** | (2006.01) |
| ***H04N 17/00*** | (2006.01) |
| *G06T 7/90* | (2017.01) |
| *G06T 5/00* | (2006.01) |

(52) U.S. Cl.

CPC ........... *H04N 9/646* (2013.01); *H04N 9/0451* (2018.08); *H04N 17/002* (2013.01); *H04N 17/02* (2013.01); *G06T 5/003* (2013.01); *G06T 7/90* (2017.01); *G06T 2207/10024* (2013.01); *G06T 2207/20192* (2013.01)

(58) Field of Classification Search

CPC ....... H04N 19/00024; H04N 19/00139; H04N 19/00315; H04N 19/00448; H04N 1/40012; H04N 1/40018; H04N 1/40025; H04N 1/40031; H04N 1/40037; H04N 1/40043; H04N 1/4005; H04N 1/40056; H04N 1/40062; H04N 1/40068; H04N 1/40075; H04N 9/646; H04N 9/0451; H04N 17/002; H04N 17/02

USPC .......................................... 382/162; 328/162

See application file for complete search history.

(56) References Cited

U.S. PATENT DOCUMENTS

| | | | |
|---|---|---|---|
| 5,596,367 A | 1/1997 | Hamilton, Jr. et al. | |
| 9,420,276 B2 * | 8/2016 | Liang | G06T 7/80 |
| 2002/0167602 A1 | 11/2002 | Nguyen | |

* cited by examiner

*Primary Examiner* — Duy M Dang

(74) *Attorney, Agent, or Firm* — Locke Lord LLP; Tim Tingkang Xia, Esq.

(57) ABSTRACT

A color-shift calibration method is provided to process an image including pixels, in which an arrangement of the pixels corresponds to a Bayer color filter array and the pixels include first green pixels, second green pixels, red pixels and blue pixels. The color-shift calibration method includes the steps outlined below. A regional gradient change of the first and the second green pixels within a neighboring region corresponding to a target green pixel is calculated. An intensity difference between the first and the second green pixels is calculated. When the regional gradient change is smaller than a gradient threshold and the intensity difference exceeds an intensity threshold range, a pixel calibration is performed on the target green pixel based on the first and the second green pixels.

10 Claims, 4 Drawing Sheets

100
101
Calculating circuit
102
Comparing circuit
104
Color-shift calibration circuit
$G_{R(i,j)}$
$G_{R'(i,j)}$
$B_D$
106
Output circuit
$G_{grad(i,j)}$
103

101

| | Col 1 | Col 2 | Col 3 | Col 4 | Col 5 | Col 6 | Col 7 |
|---|---|---|---|---|---|---|---|
| Row 1 | $G_R$ | R | $G_R$ | R | $G_R$ | R | $G_R$ |
| Row 2 | B | $G_B$ | B | $G_B$ | B | $G_B$ | B |
| Row 3 | $G_R$ | R | $G_R$ | R | $G_R$ | R | $G_R$ |
| Row 4 | B | $G_B$ | B | $G_B$ | B | $G_B$ | B |
| Row 5 | $G_R$ | R | $G_R$ | R | $G_R$ | R | $G_R$ |
| Row 6 | B | $G_B$ | B | $G_B$ | B | $G_B$ | B |
| Row 7 | $G_R$ | R | $G_R$ | R | $G_R$ | R | $G_R$ |

| | | | | |
|---|---|---|---|---|
| $G_R$ (i-2, j-2) | R | $G_R$ (i-2, j) | R | $G_R$ (i-2, j+2) |
| B | $G_B$ (i-1, j-1) | B | $G_B$ (i-1, j+1) | B |
| $G_R$ (i, j-2) | R | $G_R$ (i, j) | R | $G_R$ (i, j+2) |
| B | $G_B$ (i+1, j-1) | B | $G_B$ (i+1, j+1) | B |
| $G_R$ (i+2, j-2) | R | $G_R$ (i+2, j) | R | $G_R$ (i+2, j+2) |

COLOR-SHIFT CALIBRATION METHOD AND DEVICE

RELATED APPLICATIONS

This application claims priority to Taiwan Application Serial Number 106138673, filed Nov. 8, 2017, which is herein incorporated by reference.

BACKGROUND

Field of Invention

The present disclosure relates to a color-shift calibration technology. More particularly, the present disclosure relates to a color-shift calibration method and a color-shift calibration device.

Description of Related Art

A Bayer color filter array is often deployed over sensors to record information of different colors to lower the cost in consumer electronic products that uses a single sensor component to retrieve images. However, such a design usually results in a color-shift condition that tiny intensity differences occur in green pixels. The color-shift condition further results in maze patterns or distortions of colors and tints in the images generated by subsequent demosaicing process.

Accordingly, what is needed is a color-shift calibration method and a color-shift calibration device to address the issues mentioned above.

SUMMARY

An aspect of the present disclosure is to provide a color-shift calibration method to process an image including pixels, in which an arrangement of the pixels corresponds to a Bayer color filter array and the pixels include a plurality of red pixels, a plurality of blue pixels, a plurality of first green pixels related to the red pixels and a plurality of second green pixels related to the blue pixels. The color-shift calibration method includes the steps outlined below. A regional gradient change of the first and the second green pixels within a neighboring region corresponding to a target green pixel of the image is calculated. An intensity difference between the first and the second green pixels within the neighboring region is calculated. A pixel calibration is performed on the target green pixel based on the first and the second green pixels to generate a calibrated target green pixel when the regional gradient change is smaller than a gradient threshold and the intensity difference exceeds an intensity threshold range.

Another aspect of the present disclosure is to provide a color-shift calibration device to process an image including pixels, in which an arrangement of the pixels corresponds to a Bayer color filter array and the pixels include a plurality of red pixels, a plurality of blue pixels, a plurality of first green pixels related to the red pixels and a plurality of second green pixels related to the blue pixels. The color-shift calibration device includes a calculating circuit, a comparing circuit and a color-shift calibration circuit. The calculating circuit is configured to calculate a regional gradient change of the first and the second green pixels within a neighboring region corresponding to a target green pixel of the image. The comparing circuit is configured to calculate an intensity difference between the first and the second green pixels within the neighboring region. The color-shift calibration circuit is configured to perform a pixel calibration on the target green pixel based on the first and the second green pixels to generate a calibrated target green pixel when the regional gradient change is smaller than a gradient threshold and the intensity difference exceeds an intensity threshold range.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 2A is a diagram of an image in an embodiment of the present invention;

FIG. 2B is a 5×5 window of the image in an embodiment of the present invention;

DETAILED DESCRIPTION

Figure 1:
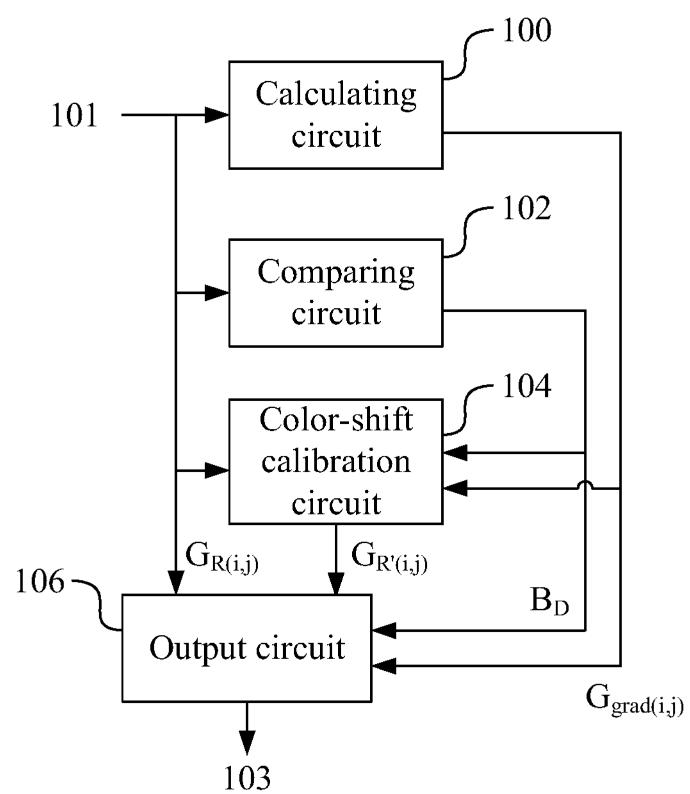
FIG. 1 is a diagram of a color-shift calibration device in an embodiment of the present disclosure.

Reference is made to FIG. 1. FIG. 1 is a diagram of a color-shift calibration device 1 in an embodiment of the present disclosure. The color-shift calibration device 1 is configured to process an image 101 and includes pixels includes a calculating circuit 100, a comparing circuit 102, a color-shift calibration circuit 104 and an output circuit 106.

Reference is now made to FIG. 2A. FIG. 2A is a diagram of an image 101 in an embodiment of the present invention.

In the present embodiment, the arrangement of the pixels of the image 101 corresponds to a Bayer color filter array and the pixels include a plurality of red pixels R, a plurality of blue pixels B, a plurality of first green pixels GR related to the red pixels and a plurality of second green pixels GB related to the blue pixels.

In an embodiment, the first green pixels GR and the red pixels R are disposed in an interlaced manner at the m-th row of the pixels. The second green pixels GB and the blue pixels B are disposed in the interlaced manner at the m−1-th row and/or the m+1-th row. The first green pixels are disposed at the n-th column of the pixels and the second green pixels are disposed at the n−1-th column and/or the n+1-th column of the pixels, wherein m and n are respectively an even number or an odd number.

For example, when both m and n are odd numbers, the first green pixels GR and the red pixels R can be disposed in the interlaced manner at the first row, the third row, the fifth row, etc. The second green pixels GB and the blue pixels B can be disposed in the interlaced manner at the second row, the fourth row, the sixth row, etc. At the same time, the first green pixels GR can be disposed at the first column, the third column, the fifth column, etc. The second green pixels GB are disposed at the second column, the fourth column, the sixth column, etc.

It is appreciated that in an embodiment, m and n can also be both even numbers. In another embodiment, one of m and n is an even number and the other one is an odd number. The present invention is not limited thereto.

Reference is now made to FIG. 2B. FIG. 2B is a 5×5 window of the image 101 in an embodiment of the present invention.

The central pixel of the window is a first green pixel GR and corresponds to the i-th row and the j-th column (denoted by $G_{R(i,j)}$). The first green pixels GR and the red pixels R are disposed in the interlaced manner at the i-th row, the i−2-th row and the i+2-th row. The second green pixels GB and the blue pixels B are disposed in the interlaced manner at the i−1-th row and the i+1-th row. The first green pixels GR are disposed at the j−2-th column, the j-th column and the j+2-th column. The second green pixels GB are disposed at the j−1-th column and the j+1-th column.

Each of the components of the color-shift calibration device 1 is described in detail in accompany with FIG. 1 and FIG. 2B at the same time.

The calculating circuit 100 is configured to calculate a regional gradient change of the first green pixels GR and the second green pixels GB within a neighboring region corresponding to a target green pixel of the image 101.

In an embodiment, the target green pixel can be the central pixel $G_{R(i,j)}$ corresponding to the i-th row and the j-th column, as illustrated in FIG. 2B. In an embodiment, the neighboring region is the region that uses the pixel $G_{R(i,j)}$ as the center and is covered by the first green pixels GR and the second green pixels GB closest to the pixel $G_{R(i,j)}$.

Take FIG. 2B as an example, the first green pixels GR that are closest to the central pixel $G_{R(i,j)}$ are the first green pixels GR (denoted as $G_{R(j-2,j)}$, $G_{R(i+2,j)}$, $G_{R(i,j)}$, $G_{R(i,j-2)}$, $G_{R(i,j+2)}$) located at (i−2, j), (i, j−2), (i, j), (i, j+2) and (i+2, j). The second green pixels GB that are closest to the central pixel $G_{R(i,j)}$ are the second green pixels GB (denoted as $G_{B(i-1,j-1)}$, $G_{B(i-1,j+1)}$, $G_{B(i+1,j-1)}$, $G_{B(i+1,j+1)}$ located at (i−1, j−1), (i−1, j+1), (i+1, j−1) and (i+1, j+1).

In an actual implementation, the calculating circuit 100 can be implemented by a combination of various operation units, such as, but not limited to a combination of an adder, a subtractor, a multiplier, a divider and a bit shifter to perform arithmetic operation.

In an embodiment, the calculating circuit 100 calculates a first weighted average $G_{Ravg}$ according to the first green pixels $G_R$ within the neighboring region and calculates a second weighted average $G_{Bavg}$ according to the second green pixels $G_B$ within the neighboring region. Further, the calculating circuit 100 calculates the regional gradient change $G_{grad(i,j)}$ according to a difference of the first weighted average $G_{Ravg}$ and the second weighted average $G_{Bavg}$.

For example, when the calculating circuit 100 calculates the first weighted average $G_{Ravg}$ of the first green pixels $G_{R(i-2,j)}$, $G_{R(i+2,j)}$, $G_{R(i,j)}$, $G_{R(i,j-2)}$ and $G_{R(i,j+2)}$, the following equation is used:

$$G_{Ravg}=(4\times G_{R(i,j)}+1\times G_{R(i-2,j)}+1\times G_{R(i+2,j)}+1\times G_{R(i,j-2)}+1\times G_{R(i,j+2)})/8$$

When the calculating circuit 100 calculates the second weighted average $G_{Bavg}$ of the second green pixels $G_{B(i-1,j-1)}$, $G_{B(i-1,j+1)}$, $G_{B(i+1,j-1)}$, and $G_{R(i+1,j+1)}$, the following equation is used:

$$G_{Ravg}=(1\times G_{R(i-1,j-1)}+1\times G_{B(i-1,j+1)}+1\times G_{B(i+1,j-1)}+1\times G_{B(i+1,j+1)})/4$$

Each of the numbers in front of the first green pixels $G_R$ and the second green pixels $G_B$ is the weighting number. In the present example, since a weighting numbers is four and the sums of equation are divided by 8 and 4 respectively, the bit shifter can be used in the implementation instead of the divider that is area-consuming and highly complex. However, in different embodiments, the amounts of the weighting values can be adjusted. The present invention is not limited thereto.

As a result, the regional gradient change $G_{grad(i,j)}$ can be expressed by the following equation:

$$G_{grad(i,j)}=|G_{Ravg}-G_{Bavg}|$$

When the regional gradient change $G_{grad(i,j)}$ is smaller than a gradient threshold, the neighboring region of the target green pixel $G_{R(i,j)}$ is a flat region. When the regional gradient change $G_{grad(i,j)}$ is not smaller than a gradient threshold, the neighboring region of the target green pixel $G_{R(i,j)}$ is not a flat region and includes edges or textures that the intensity changes dramatically.

The comparing circuit 102 is configured to calculate an intensity difference between the first green pixels $G_R$ and the second green pixels $G_B$ within the neighboring region.

In a practical condition, the comparing circuit 102 can be implemented by such as, but not limited to a plurality of comparators to perform comparison on two values respectively.

In an embodiment, the comparing circuit 102 compares the intensities of each pair of at least part of the first green pixels $G_R$ and the second green pixels $G_B$ closest to the first green pixels $G_R$ in the neighboring region to accumulate a first number of times that the intensity of the first green pixels $G_R$ is larger than the intensity of the second green pixels GB and a second number of times that the intensity of the second green pixels $G_B$ is larger than the intensity of the first green pixels $G_R$.

For example, the comparing circuit 102 compares the first green pixel $G_{R(i,j)}$ with the second green pixels $G_{B(i-1,j-1)}$, $G_{B(i-1,j+1)}$, $G_{B(i+1,j-1)}$ and $G_{B(i+1,j+1)}$ closest to the first green pixel $G_{R(i,j)}$ respectively, compares the first green pixel $G_{R(i-2,j)}$ with the second green pixels $G_{B(i-1,j-1)}$ and $G_{B(i-1,j+1)}$ closest to the first green pixel $G_{R(i-2,j)}$ respectively and compares the first green pixel $G_{R(i,j-2)}$ with the second green pixels $G_{B(i-1,j-1)}$ and $G_{B(i+1,j-1)}$ closest to the first green pixel $G_{R(i,j-2)}$ respectively.

Further, the comparing circuit 102 compares the first green pixel $G_{R(i,j+2)}$ with the second green pixels $G_{B(i-1,j+1)}$ and $G_{B(j+1,j+1)}$ closest to the first green pixel $G_{R(i,j+2)}$ respectively and compares the first green pixel $G_{R(i+2,j)}$ with the second green pixels $G_{B(j+1,j-1)}$ and $G_{B(i+1,j+1)}$ closest to the first green pixel $G_{R(i+2,j)}$ respectively.

Accordingly, the comparing circuit 102 performs comparisons for twelve times and further generates the accumulation result as the intensity difference BD between the first green pixels $G_R$ and the second green pixels $G_B$.

In an embodiment, when one of the first green pixels $G_R$ is larger than one of the second green pixels $G_B$, the value of 1 is accumulated. When one of the first green pixels $G_R$ is not larger than one of the second green pixels $G_B$, the value of 0 is accumulated. In other embodiments, other values can be selectively used to perform accumulation.

The accumulation result of the comparison includes a first number of times that the intensity of the first green pixels $G_R$ is larger than the intensity of the second green pixels $G_B$ (accumulated as 1 for each time) and a second number of times that the intensity of the second green pixels $G_B$ is larger than the intensity of the first green pixels $G_R$ (accumulated as 0 for each time). The accumulation result can be used as the intensity difference BD.

When the accumulation result of the comparison is closer to 12, the intensity of the first green pixels $G_R$ tends to be larger than the intensity of the second green pixels $G_B$. When the accumulation result of the comparison is closer to 0, the intensity of the second green pixels $G_B$ tends to be larger than the intensity of the first green pixels $G_R$.

As a result, when the intensity difference BD is larger than a first threshold value or the intensity difference BD is smaller than a second threshold value, the intensity difference BD is determined to exceed the intensity threshold range. More specifically, the color-shift condition occurs between the first green pixels $G_R$ and the second green pixels $G_B$.

Take the accumulation method described above as an example, the first threshold value can be such as, but not limited to 10. The second threshold value can be such as, but not limited to 2. When the intensity difference BD is above 10, the intensity of the first green pixels $G_R$ is larger and the green color tends to include more red color. When the intensity difference BD is below 2, the intensity of the second green pixels $G_B$ is larger and the green color tends to include more blue color.

The color-shift calibration circuit 104 is configured to perform a pixel calibration on the first green pixels $G_R$ and the second green pixels $G_B$ when the regional gradient change $G_{grad(i,j)}$ is smaller than the gradient threshold and the intensity difference BD exceeds the intensity threshold range.

The color-shift calibration circuit 104 may include such as, but not limited to an adder, a subtractor, a multiplier, a divider and a bit shifter to perform arithmetic operation.

In an embodiment, the color-shift calibration circuit 104 averages the target green pixel $G_{R(i,j)}$ and the first green pixels $G_R$ and/or the second green pixels $G_B$ within the neighboring region to perform a low pass filter to accomplish object of the color-shift calibration.

For example, for the target green pixel $G_{R(i,j)}$ that is a first green pixel $G_R$, the color-shift calibration circuit 104 averages the second green pixels $G_B$ first:

$$G_{Bavg}=(G_{B(i-1,j-1)}+G_{B(i-1,j+1)}+G_{B(i+1,j-1)}+G_{B(i+1,j+1)})/4$$

Subsequently, the color-shift calibration circuit 104 further averages the average of the second green pixels $G_B$ and the target green pixel $G_{R(i,j)}$ to generate the calibrated target green pixel $G_{R'(i,j)}$:

$$G_{R'(i,j)}=(G_{Bavg}+G_{R(i,j)})/2$$

The output circuit 106 is further configured to generate the output image 103. When the regional gradient change $G_{grad(i,j)}$ is smaller than the gradient threshold and the intensity difference BD exceeds the intensity threshold range, the output circuit 106 outputs the calibrated target green pixel $G_{R'(i,j)}$ as the pixel at the position of (i, j) of the output image 103. When the regional gradient change $G_{grad(i,j)}$ is not smaller than the gradient threshold or the intensity difference BD does not exceed the intensity threshold range, the output circuit 106 outputs the target green pixel $G_{R(i,j)}$ as the pixel at the position of (i, j) of the output image 103.

In an embodiment, the comparing circuit 102 can selectively cease to perform the comparison operation when the regional gradient change $G_{grad(i,j)}$ is not smaller than the gradient threshold such that the output circuit 106 directly outputs the target green pixel $G_{R(i,j)}$.

As a result, the color-shift calibration device 1 of the present invention can determine the color-shift condition in the flat region of the image 101 and perform calibration on the target green pixel. Such a design prevents the edges or the textures in the image 101 from being blurred. The color-shift of the green pixels can be calibrated efficiently while the sharpness of the textures and the edges can be preserved.

It is appreciated that configuration and the calculating method of the calculating circuit 100, the comparing circuit 102 and the color-shift calibration circuit 104 described above is merely an example. In other embodiments, other methods can be used to calculate the regional gradient change and the intensity difference and process the low pass filtering. The present invention is not limited thereto.

Figure 3:
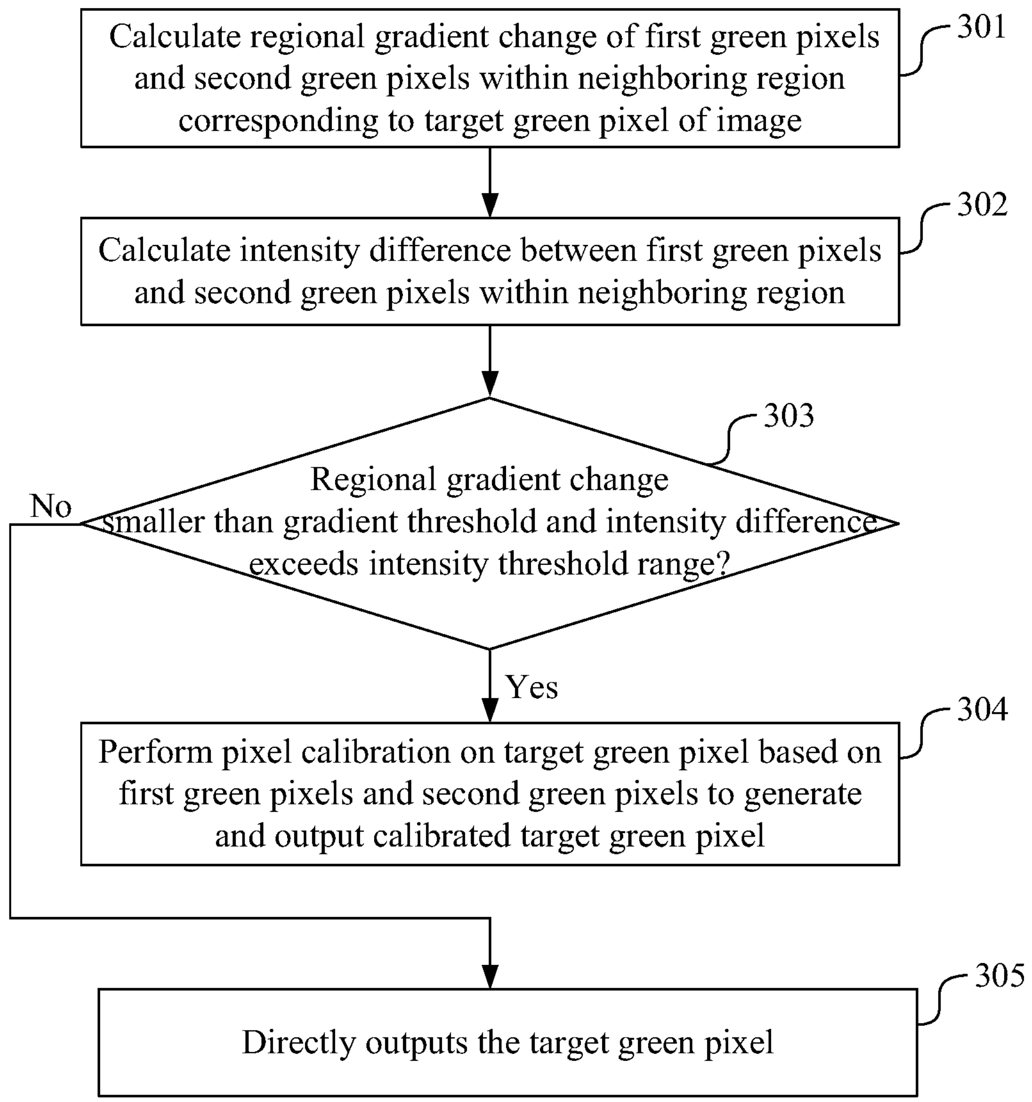
FIG. 3 is a flow chart of a color-shift calibration method in an embodiment of the present invention.

Reference is now made to FIG. 3. FIG. 3 is a flow chart of a color-shift calibration method 300 in an embodiment of the present invention. The color-shift calibration method 300 can be used in the color-shift calibration device 1 illustrated in FIG. 1. The color-shift calibration method 300 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the calculating circuit 100 calculates the regional gradient change $G_{grad(i,j)}$ of the first green pixels $G_R$ and the second green pixels $G_B$ within the neighboring region corresponding to the target green pixel $G_{R(i,j)}$ of the image 101.

In step 302, the comparing circuit 102 calculates the intensity difference BD between the first green pixels $G_R$ and the second green pixels $G_B$ within the neighboring region.

In step 303, whether the regional gradient change $G_{grad(i,j)}$ is smaller than the gradient threshold and whether the intensity difference BD exceeds the intensity threshold range are determined.

In step 304, when the regional gradient change $G_{grad(i,j)}$ is smaller than the gradient threshold and the intensity difference BD exceeds the intensity threshold range, the color-shift calibration circuit 104 performs the pixel calibration on the target green pixel $G_{R(i,j)}$ based on the first green pixels $G_R$ and the second green pixels $G_B$ to generate the calibrated target green pixel $G_{R'(i,j)}$ such that the output circuit 106 outputs the calibrated target green pixel $G_{R'(i,j)}$.

In step 305, when the regional gradient change $G_{grad(i,j)}$ is not smaller than the gradient threshold or the intensity difference BD exceeds the intensity threshold range, the output circuit 106 directly outputs the target green pixel $G_{R(i,j)}$.

Figure 4:
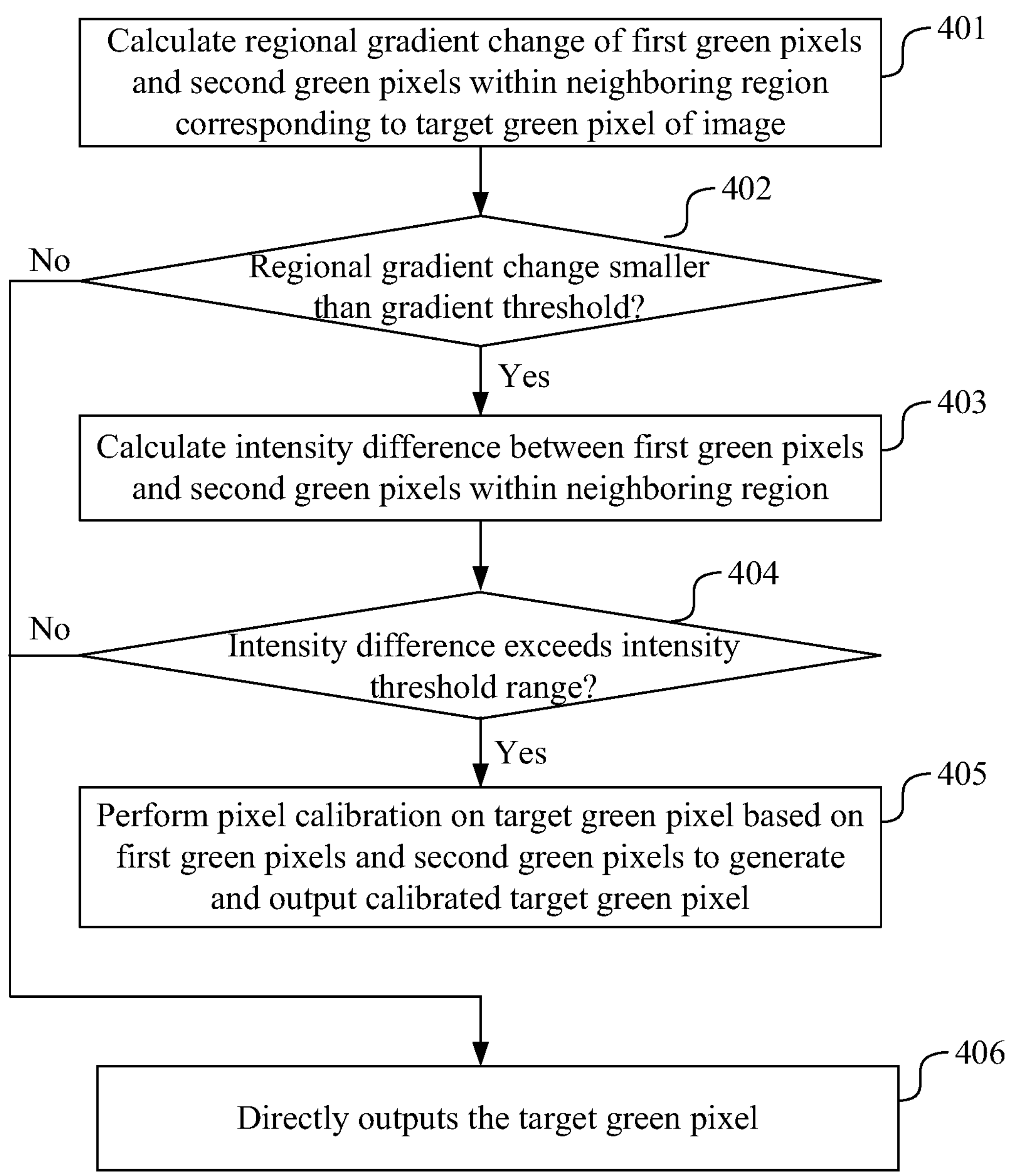
FIG. 4 is a flow chart of a color-shift calibration method in an embodiment of the present invention.

Reference is now made to FIG. 4. FIG. 4 is a flow chart of a color-shift calibration method 400 in an embodiment of the present invention. The color-shift calibration method 400 can be used in the color-shift calibration device 1 illustrated in FIG. 1. The color-shift calibration method 300 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 401, the calculating circuit 100 calculates the regional gradient change $G_{grad(i,j)}$ of the first green pixels $G_R$ and the second green pixels $G_B$ within the neighboring region corresponding to the target green pixel $G_{R(i,j)}$ of the image 101.

In step 402, whether the regional gradient change $G_{grad(i,j)}$ is smaller than the gradient threshold determined.

When the regional gradient change $G_{grad(i,j)}$ is determined to be smaller than the gradient threshold, the flow goes to step 403, wherein the comparing circuit 102 calculates the intensity difference BD between the first green pixels $G_R$ and the second green pixels $G_B$ within the neighboring region.

In step 404, whether the intensity difference BD exceeds the intensity threshold range is determined.

In step 405, when the intensity difference BD is determined to exceed the intensity threshold range, the color-shift calibration circuit 104 performs the pixel calibration on the target green pixel $G_{R(1,j)}$ based on the first green pixels $G_R$ and the second green pixels $G_B$ to generate the calibrated target green pixel $G_{R'(i,j)}$ such that the output circuit 106 outputs the calibrated target green pixel $G_{R'(i,j)}$.

When the regional gradient change $G_{grad(i,j)}$ is determined to be not smaller than the gradient threshold in step 402 or when the intensity difference BD is determined to not exceed the intensity threshold range, the flow goes to step 406 such that the output circuit 106 directly outputs the target green pixel $G_{R(i,j)}$.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A color-shift calibration method to process an image comprising pixels, in which an arrangement of the pixels corresponds to a Bayer color filter array and the pixels include a plurality of red pixels, a plurality of blue pixels, a plurality of first green pixels related to the red pixels and a plurality of second green pixels related to the blue pixels, wherein the color-shift calibration method comprises:

calculating a regional gradient change of the first and the second green pixels within a neighboring region corresponding to a target green pixel of the image;

calculating an intensity difference between the first and the second green pixels within the neighboring region; and performing a pixel calibration on the target green pixel based on the first and the second green pixels to generate a calibrated target green pixel when the regional gradient change is smaller than a gradient threshold and the intensity difference exceeds an intensity threshold range.

2. The color-shift calibration method of claim 1, wherein the step of calculating the regional gradient change further comprises:

calculating a first weighted average according to the first green pixels within the neighboring region;

calculating a second weighted average according to the second green pixels within the neighboring region; and calculating the regional gradient change according to a difference of the first weighted average and the second weighted average.

3. The color-shift calibration method of claim 1, wherein the step of calculating the intensity difference further comprises:

comparing the intensities of each pair of the first green pixels and the second green pixels closest to the first green pixels within the neighboring region to accumulate a first number of times that the intensity of the first green pixels is larger than the intensity of the second green pixels and a second number of times that the intensity of the second green pixels is larger than the intensity of the first green pixels; and generating the intensity difference by adding the first number and the second number of times;

wherein when the intensity difference is larger than a first threshold value or the intensity difference is smaller than a second threshold value, the intensity difference is determined to exceed the intensity threshold range.

4. The color-shift calibration method of claim 1, wherein the first green pixels and the red pixels are disposed in an interlaced manner at the m-th row of the pixels, the second green pixels and the blue pixels are disposed in the interlaced manner at the m−1-th row and/or the m+1-th row, the first green pixels are disposed at the n-th column of the pixels and the second green pixels are disposed at the n−1-th column and/or the n+1-th column of the pixels, wherein m and n are respectively an even number or an odd number.

5. The color-shift calibration method of claim 1, further comprising:

outputting the calibrated target green pixel as one of the pixels of an output image when the regional gradient change is smaller than the gradient threshold and the intensity difference exceeds the intensity threshold range; and outputting the target green pixel as one of the pixels of the output image when the regional gradient change is not smaller than the gradient threshold or the intensity difference does not exceed the intensity threshold range.

6. The color-shift calibration method of claim 1, wherein the step of performing the pixel calibration further comprises:

performing a low pass filtering on the target green pixel according to the first green pixels and the second green pixels within the neighboring region to generate the calibrated target green pixel.

7. A color-shift calibration device to process an image comprising pixels, in which an arrangement of the pixels corresponds to a Bayer color filter array and the pixels comprise a plurality of red pixels, a plurality of blue pixels, a plurality of first green pixels related to the red pixels and a plurality of second green pixels related to the blue pixels, wherein the color-shift calibration device comprises:

a calculating circuit configured to calculate a regional gradient change of the first and the second green pixels within a neighboring region corresponding to a target green pixel of the image;

a comparing circuit configured to calculate an intensity difference between the first and the second green pixels within the neighboring region; and a color-shift calibration circuit configured to perform a pixel calibration on the target green pixel based on the first and the second green pixels to generate a calibrated target green pixel when the regional gradient change is smaller than a gradient threshold and the intensity difference exceeds an intensity threshold range.

8. The color-shift calibration device of claim 7, wherein the calculating circuit is further configured to calculate a first weighted average according to the first green pixels within the neighboring region, calculate a second weighted average according to the second green pixels within the neighboring region and calculate the regional gradient change according to a difference of the first weighted average and the second weighted average.

9. The color-shift calibration device of claim 7, wherein the comparing circuit is further configured to compare the intensities of each pair of the first green pixels and the second green pixels closest to the first green pixels within the neighboring region to accumulate a first number of times that the intensity of the first green pixels is larger than the intensity of the second green pixels and a second number of times that the intensity of the second green pixels is larger than the intensity of the first green pixels and generate the intensity difference by adding the first number and the second number of times;

wherein when the intensity difference is larger than a first threshold value or the intensity difference is smaller than a second threshold value, the intensity difference is determined to exceed the intensity threshold range.

10. The color-shift calibration device of claim 7, wherein the pixel calibration circuit is further configured to average the target green pixels, the first green pixels and/or the second green pixels within the neighboring region.

* * * * *